(12) United States Patent
Yu (10) Patent No.: US 10,079,123 B2
(45) Date of Patent: Sep. 18, 2018

(54) SWITCH ACTUATOR WITH ENHANCED HAPTIC FEEDBACK

(71) Applicant: Zhengming Yu, Huizhou (CN)

(72) Inventor: Zhengming Yu, Huizhou (CN)

( * ) Notice: Subject to any disclaimer, the term of this patent is extended or adjusted under 35 U.S.C. 154(b) by 0 days.

(21) Appl. No.: 15/516,391

(22) PCT Filed: Dec. 29, 2015

(86) PCT No.: PCT/CN2015/099413
§ 371 (c)(1),
(2) Date: Apr. 1, 2017

(87) PCT Pub. No.: WO2016/107545
PCT Pub. Date: Jul. 7, 2016

(65) Prior Publication Data
US 2017/0309421 A1    Oct. 26, 2017

(30) Foreign Application Priority Data
Dec. 29, 2014  (CN) .......................... 2014 1 0832784

(51) Int. Cl.
*H01H 13/705* (2006.01)
*H01H 13/14* (2006.01)
(Continued)

(52) U.S. Cl.
CPC .............. *H01H 13/14* (2013.01); *B41J 5/12* (2013.01); *G06F 3/0202* (2013.01);
(Continued)

(58) Field of Classification Search
CPC ............. H01H 13/7065; H01H 13/705; H01H 2215/002; H01H 2215/03; H01H 2235/00
(Continued)

(56) References Cited

U.S. PATENT DOCUMENTS 3,674,970 A * 7/1972 Bedocs ................ H01H 13/506
                                                         200/295
4,939,327 A † 7/1990 Wu
(Continued)

FOREIGN PATENT DOCUMENTS

CN    201391210 Y    1/2010
CN    203812764 U  † 9/2014
(Continued)

OTHER PUBLICATIONS

SIPO, Search Report and Notification of Second Office Action, App. No. 201510155201.3.
(Continued)

*Primary Examiner* — Vanessa Girardi
(74) *Attorney, Agent, or Firm* — Hemisphere Law, PLLC; Zhigang Ma (57) ABSTRACT

A keyboard switch comprises an upper cover (1), a base (2), a fixed terminal (3), a movable terminal (4) and a pressing component (5). A guide column (21) is disposed on the base, the pressing component is installed on the guide column on which a return spring (8) is fitted, the upper end of the pressing component is exposed out of the upper cover for pressing, and the upper cover is fastened to the base to form a cavity, the fixed terminal and the movable terminal are disposed on one side of the pressing component in the cavity, and one end of the fixed terminal and one end of the movable terminal penetrate out of the base to be connected to an external circuit. The pressing component moves up and down to drive the movable terminal to move, and further to control contact and disconnection between the other end of the movable terminal and the other end of the fixed terminal. Further, an elastic auxiliary component for interfering with the pressing component to enhance the pressing sense is disposed on the other side of the pressing component, and the pressing component interferes with the elastic auxiliary
(Continued)

component while moving up and down to drive the movable terminal. The keyboard switch makes full use of the inner space of the switch and an auxiliary device is added in the switch, so that the switch has good touch and voice, a simple structure and a long life.

10 Claims, 11 Drawing Sheets

(51) Int. Cl.
    *H01H 13/10*     (2006.01)
    *H01H 13/70*     (2006.01)
    *B41J 5/12*     (2006.01)
    *G06F 3/02*     (2006.01)
    *G06F 15/02*     (2006.01)

(52) U.S. Cl.
    CPC .......... *G06F 15/0225* (2013.01); *H01H 13/10* (2013.01); *H01H 13/70* (2013.01); *H01H 13/705* (2013.01); *H01H 2215/03* (2013.01); *H01H 2235/00* (2013.01)

(58) Field of Classification Search
    USPC .............. 200/341, 345, 521; 400/472, 491.2, 400/491.3
    See application file for complete search history.

(56) References Cited

U.S. PATENT DOCUMENTS

| | | | | |
|---|---|---|---|---|
| 5,004,880 | A | * | 4/1991 | Koutaka ................ H01H 13/14 |
| | | | | 200/308 |
| 5,015,811 | A | † | 5/1991 | Moriyama |
| 5,057,657 | A | † | 10/1991 | Skulic |
| 9,305,721 | B2 | * | 4/2016 | Izawa ................ H01H 13/023 |
| 2014/0251778 | A1 | † | 9/2014 | Izawa |

FOREIGN PATENT DOCUMENTS

TW           195991 U   † 12/1992
TW           M328656   † 3/2008

OTHER PUBLICATIONS

SIPO, Search Report and Notification of Second Office Action, App. No. 201510155566.6.
SIPO, Search Report and Notification of Second Office Action, App. No. 201510155190.9.

\* cited by examiner
† cited by third party

SWITCH ACTUATOR WITH ENHANCED HAPTIC FEEDBACK

BACKGROUND OF THE INVENTION

1. Technical Field

The invention relates to small switches, in particular to a keyboard switch used on a keyboard.

2. Description of Related Art

For most operations of existing equipment, a keyboard switch is needed to serve as an input means, the experience of input equipment depends on the quality of the keyboard switch, and thus good hand sense and long service life need to be guaranteed. According to an existing keyboard switch using a metal sheet as a movable contact, the elastic force of the metal sheet is relatively insufficient due to the limitation of the internal space of the switch, and consequentially the key pressing hand sense and service life are affected.

BRIEF SUMMARY OF THE INVENTION

For this reason, the invention aims to provide a microswitch which is good in hand sense, simple in structure and convenient to manufacture.

According to the technical scheme adopted by the invention for solving the problems: a keyboard switch includes an upper cover, a base, a fixed terminal, a movable terminal and a pressing component, a guide column is arranged on the base, the pressing component is installed on the guide column on which a return spring is sleeved, and the upper end of the pressing component is exposed out of the upper cover for pressing; the upper cover and the base are buckled, so that a cavity is formed between the upper cover and the base; the fixed terminal and the movable terminal are arranged on a side, in the cavity, of the pressing component; one end of the fixed terminal and one end of the movable terminal both stretch out of the base to be connected with an external circuit; the pressing component moves up and down to drive the movable terminal to move, and further to control contact and disconnection between the other end of the movable terminal and the other end of the fixed terminal. In addition, an elastic auxiliary component which interferes with the pressing component to enhance a pressing sense is further arranged on the side of the pressing component, the pressing component moves up and down to drive the movable terminal to act and meanwhile the pressing component interferes with the elastic auxiliary component so that the key pressing sense of the keyboard switch is enhanced.

According to one specific scheme, a touch-sensitive piece of metal is adopted to serve as the elastic auxiliary component, a convex rib is arranged on a corresponding side face of the pressing component, and the pressing component moves up and down to drive the movable terminal to act and squeeze the piece of metal through the convex rib at the same time to enhance the pressing sense. The convex rib is arranged in a vertical direction of the side face of the pressing component, the touch-sensitive piece of metal is in an L shape and is installed transversely, and one end of the touch-sensitive piece of metal is bent outwards to form an elastic bent part corresponding to the convex rib.

According to another specific scheme, the elastic auxiliary component is a torsional spring, the torsional spring is arranged on the base, one end of the torsional spring is fixed to the base, the other end of the torsional spring stretches out towards a side edge of the pressing component, a convex rib is arranged on the corresponding side face of the pressing component, and the pressing component links the movable terminal to act and squeezes the torsional spring through the convex rib at the same time to enhance the pressing sense.

In the scheme of the torsional spring, a bent part is arranged at the stretching-out end of the torsional spring, a guide slope is arranged at the lower end of the convex rib on the corresponding side face of the pressing component, the stretching-out end of the torsional spring abuts against the lower portion of the upper cover by means of upward elastic force in a non-pressing state, the bent part transversely protrudes to be limited on the guide slope, the bent part is pressed by the guide slope to move downwards to a certain position by pressing the pressing component downwards, and the bent part disengages from the guide slope, rebounds to restore and knocks the lower portion of the upper cover to make sounds; by the adoption of the scheme, the auditory effect can be improved while the pressing sense is enhanced.

Preferably, guide grooves are formed in the portions, corresponding to the convex rib, of the upper cover and the base correspondingly.

Preferably, at least one protrusion extends out towards the movable terminal from the pressing component, and when the pressing component moves up and down, an acting arm is driven by the protrusion to move to be in contact with the movable terminal or be disconnected with the movable terminal.

Preferably, limiting columns or limiting grooves are arranged on the portions, corresponding to the two side edges of the pressing component, of the base, and limiting columns or limiting grooves are arranged on the two side edges of the pressing component correspondingly.

Preferably, the keyboard switch further includes a key indicator light. Through holes used for installing the indicator light are formed in the base and the upper cover correspondingly.

Compared with the prior art, the internal space of the switch of the invention is fully utilized; by additionally arranging the elastic auxiliary device in the switch, a good touch sense and auditory sense are achieved in the switch pressing process on the premise that the switch is as small as possible, and the invention is particularly suitable for ultra-thin keyboard switches. Meanwhile, the structure is simple, the service life is long, and the keyboard switch has good application prospects.

DETAILED DESCRIPTION OF THE INVENTION

A further detailed description of the invention is given with accompanying drawings and embodiments as follows.

A First Embodiment

As is shown in FIGS. 1-6, the keyboard switch in the embodiment includes an upper cover 1, a base 2, a pressing component 5, a return spring 8, a movable terminal 4, a fixed terminal 3 and a torsional spring 6', an indicator light 7. A plurality of buckle holes are formed in the periphery of the upper cover 1, and bayonet fasteners are arranged on the portions, corresponding to the buckle holes of the upper cover 1, of the base 2; the upper cover 1 and the base 2 are buckled through the cooperation of the buckle holes and the bayonet fasteners, and a cavity used for containing the pressing component 5, the return spring 8, the movable terminal 4, the fixed terminal 3 and the torsional spring 6' is formed between the upper cover 1 and the base 2 after the upper cover 1 and the base 2 are buckled. A guide column 21 is arranged on the base 2, the guide column 21 is sleeved with the return spring 8, and a guide hole is formed in the middle of the guide column 21. A positioning rod 54 is arranged on the lower portion of the pressing component 5, and the pressing component 5 is matched with the return spring 8 between the pressing component 5 and the base 2 by making the positioning rod 54 stretch into the guide hole, so that downward pressing and bouncing are achieved. The two side edges of the pressing component 5 are further each provided with a limiting column 53, and the limiting columns 53 on the pressing component 5 correspond to limiting columns 23 arranged on the base 2; when the pressing component 5 is pressed down or restores under the effect of the return spring 8, the limiting columns 53 on the two side edges of the pressing component move up and down along a groove formed between the two limiting columns 23 on the base. The upper portion of the pressing component 5 stretches out of the upper cover 1 to be connected with an external key cap. A protrusion 51 and a convex rib 52' are arranged on the other two side edges of the pressing component 5 correspondingly, and the protrusion 51 is perpendicular to the side face of the pressing component 5 and is used for being matched with the movable terminal 4. The convex rib 52' is arranged in the vertical direction of the side face of the pressing component, and a guide slope 521' is arranged at the lower end of the convex rib 52' and matched with the torsional spring 6'. The torsional spring 6' is transversely arranged on the base, one end of the torsional spring 6' is fixed to the base, and the other end of the torsional spring 6' stretches out towards the side edge of the pressing component 5. An upward protrusion 62' and a transverse bent part 61' are arranged at the stretching-out end of the torsional spring; through the protrusion 62', only the front-end bent part 61' of the stretching-out end of the torsional spring makes contact with the upper cover 1, the portion close to a torsional spring body 63' does not make contact with the upper cover, and thus intervention is avoided. The stretching-out end of the torsional spring abuts against the lower portion of the upper cover by means of upward elastic force in a non-pressing state, the bent part 61' protrudes transversely to be limited on the guide slope, the bent part 61' is pressed by the guide slope to move downwards to a certain position by pressing the pressing component 5 downwards, the bent part 61' disengages from the guide slope, resounds to restore and knocks the lower portion of the upper cover to make sounds, and the auditory effect is improved.

Figure 1:
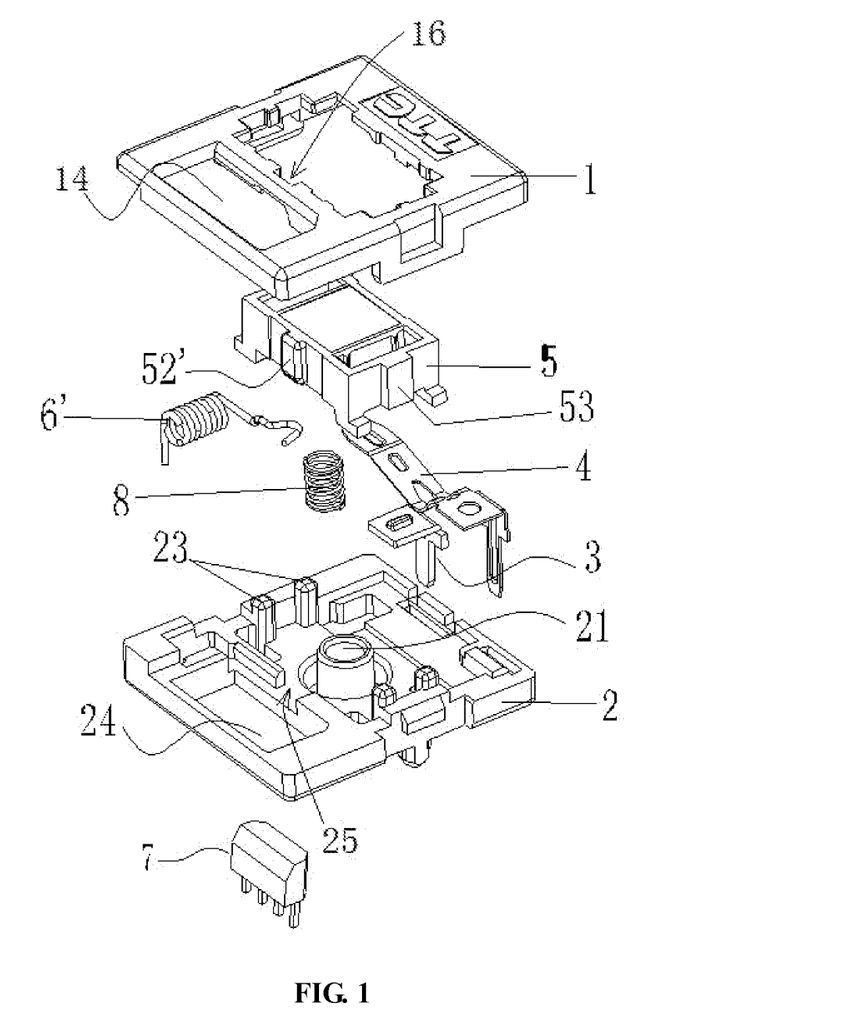
FIG. 1 is an explosive structure schematic diagram of a first embodiment of the switch of the invention.

In the embodiment, through holes 24 and 14 used for installing the indicator light are formed in the base and the upper cover correspondingly, and after the base and the upper cover are buckled, the indicator light 7 is installed in the through holes.

Figure 2:
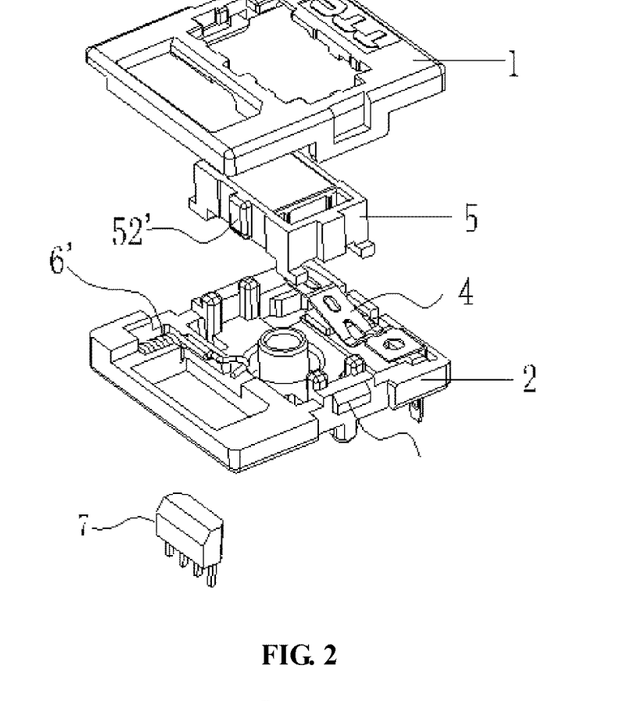
FIG. 2 is a semi-assembled structure schematic diagram of the first embodiment of the switch of the invention.
Figure 3:
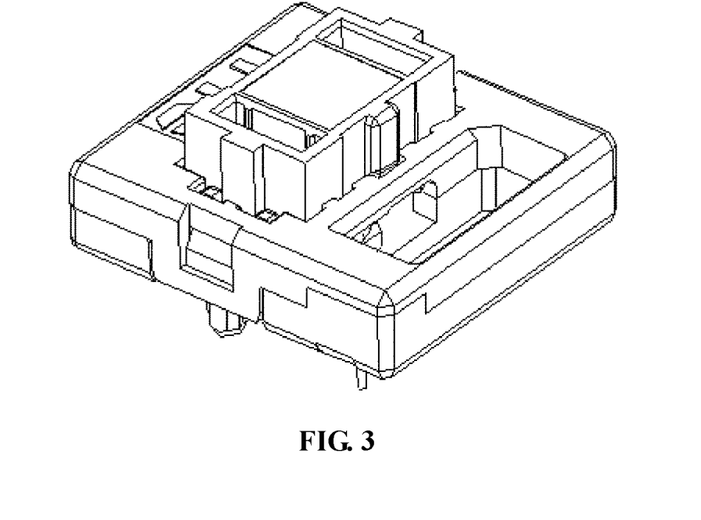
FIG. 3 is a fully-assembled structure schematic diagram of the first embodiment of the switch of the invention.
Figure 4:
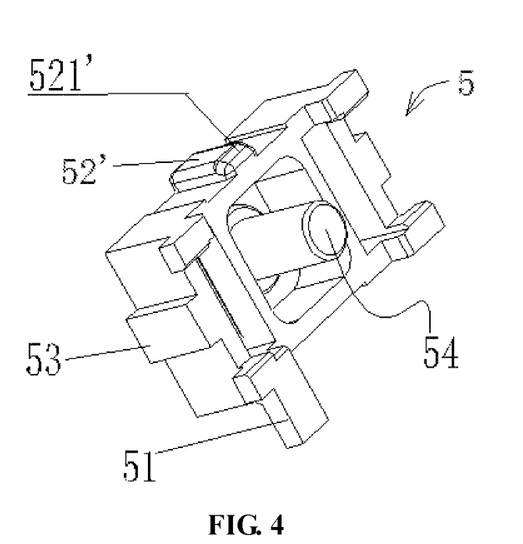
FIG. 4 is a structure schematic diagram of a pressing component in the first embodiment of the switch of the invention.
Figure 5:
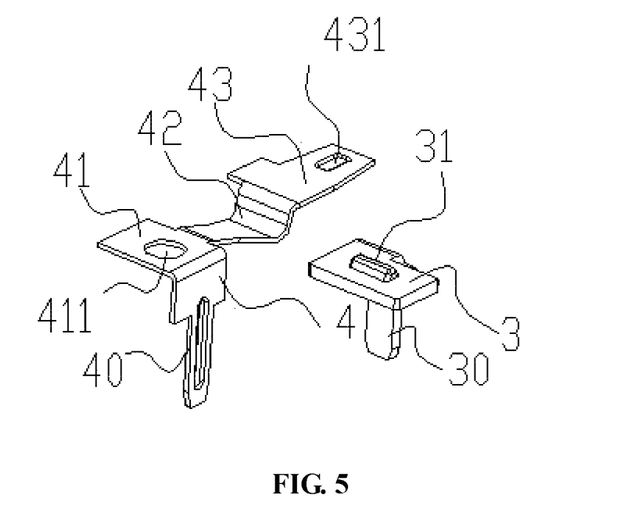
FIG. 5 is a structure schematic diagram of a fixed terminal and a movable terminal of the first embodiment of the switch of the invention.
Figure 6:
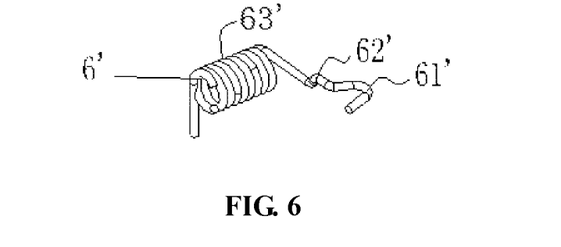
FIG. 6 is a structure schematic diagram of a torsional spring of the first embodiment of the switch of the invention.

In the embodiment, the fixed terminal 3 and the movable terminal 4 are fixed to one side of the base 2; as is shown in FIG. 2 and FIG. 5, the movable terminal 4 is a movable touch piece of metal and is transversely arranged on the portion, in front of the guide column 21, of the base 2, and the movable terminal 4 includes a fixing part 41 used for fixing, a contact part 43 vertically opposite to the fixed terminal 3, and an elastic bent part 42 connected between the fixing part 41 and the contact part 43, and the fixing part 41, the contact part 43 and the elastic bent part 42 are connected integrally; one end of the fixing part 41 stretches out of the base 2 to be connected with an external circuit, and the other end of the fixing part 41 is connected with the elastic bent part 42; a driving part is arranged at the end, close to the pressing component 5, of the contact part 43, and the driving part is square and tightly attached to the upper portion of the protrusion 51 of the pressing component 5; when the pressing component 5 moves up and down, the protrusion 51 can control the contact part 43 to move up and down, and accordingly contact between the contact part 43 and the fixed terminal 3 is achieved. The fixing part 41 is fixed to the left side, in front of the guide column 21, of the base 2, the contact part 43 is fixed to the right side, in front of the guide column 21, of the base 2, and the fixed terminal 3 is arranged at the lower end of the contact part 43. The fixed terminal 3 is of a square structure, and a welded part 30 at one end of the fixed terminal 3 stretches out of the base 2 to be connected with the external circuit. A movable contact 431 and a static contact 31 are arranged on the contact portions of the movable terminal 4 and the fixed terminal 3 correspondingly, and the movable contact 431 and the static contact 31 are of columnar structures and perpendicular to each other so that the contact effect between the movable contact 431 and the static contact 31 can be guaranteed, and poor contact is avoided. The elastic bent part 42 is of a downward bent structure, so that breakover can be achieved easily by bending the contact point through the up-down contact of the contact part 43 and the fixed terminal 3, fixed to the base 2, on the other side. A through hole 411 is further formed in the fixing part 41, a positioning column is arranged on the upper cover, and the positioning column is riveted in the through hole 411 of the fixing part 41, so that positioning and fixing of the fixing part 41 are achieved.

In the using process, when the pressing component 5 is pressed, the positioning rod of the pressing component 5 moves downwards along the guide hole of the guide column 21 of the base 2, and the return spring 8 is squeezed, the driving part of the movable terminal 4 can be tightly attached to the protrusion 51 under the elasticity of the elastic bent part 42 and moves downwards along with the protrusion 51; when the movable terminal 4 is moved downwards to a certain extent, the movable contact 432 of the contact part 43 of the movable terminal makes contact with the static contact 31 below the movable contact 431, the circuits connected to the movable terminal 4 and the fixed terminal 3 correspondingly are closed, and a pressing signal is generated; when the pressing force is eliminated after the pressing component 5 is pressed, upward force is applied to the pressing component 5 through the restoration elastic force of the return spring 8, and the protrusion 51 of the pressing component 5 is also pushed upwards at the moment; since the driving part is arranged on the upper portion of the protrusion 51, the contact part 43 of the movable terminal 4 can be pushed upwards, the contact between the movable terminal 4 and the fixed terminal 3 is cut off at the moment, and the movable terminal 4 and the fixed terminal 3 return to the positions before pressing.

A Second Embodiment

As is shown in FIGS. 7-11, the keyboard switch of the invention includes an upper cover 1, a base 2, a pressing component 5, a return spring 8, a movable terminal 4, a fixed terminal 3, a touch-sensitive piece of metal 6 and an indicator light 7. A plurality of buckle holes are formed in the periphery of the upper cover 1, and bayonet fasteners are arranged on the portions, corresponding to the buckle holes of the upper cover 1, of the base 2; the upper cover 1 and the base 2 are buckled through the cooperation of the buckle holes and the bayonet fasteners, and a cavity used for containing the pressing component 5, the return spring 8, the movable terminal 4, the fixed terminal 3 and the touch-sensitive piece of metal 6 is formed between the upper cover 1 and the base 2 after the upper cover 1 and the base 2 are buckled. A guide column 21 is arranged on the base 2, the guide column 21 is sleeved with the return spring 8, and a guide hole is formed in the middle of the guide column 21. A positioning rod is arranged on the lower portion of the pressing component 5, and the pressing component 5 is matched with the return spring 8 between the pressing component 5 and the base 2 by making the positioning rod stretch into the guide hole, so that downward pressing and bouncing are achieved. The two side edges of the pressing component 5 are further each provided with a limiting column 53, and the limiting columns 53 correspond to limiting columns 23 arranged on the base 2; when the pressing component 5 is pressed downwards or restores under the effect of the return spring 8, the limiting columns 53 on the two side edges of the pressing component move up and down along a groove formed between the two limiting columns 23. The upper portion of the pressing component 5 stretches out of the upper cover 1 so as to be connected with an external key cap. A protrusion 51 and a convex rib 52 are arranged on the other two side edges of the pressing component 5 correspondingly, the protrusion 51 is perpendicular to the side face of the pressing component, and a slope is arranged at the front end of the protrusion 51 and used for being matched with the movable terminal 4. The convex rib 52 is arranged in the vertical direction of the side face of the pressing component and used for being matched with the touch-sensitive piece of metal 6. Guide grooves 16, 25 are formed in the portions, corresponding to the convex rib 52 of the pressing component 5, of the upper cover and the base 2 correspondingly. The touch-sensitive piece of metal 6 is in an L shape and is transversely installed on the side edge of the pressing component 5, and one end of the touch-sensitive piece of metal is bent upwards to form an elastic bent part 61 corresponding to the convex rib. The touch-sensitive piece of metal 6 is fixed through a limiting groove, corresponding to the touch-sensitive piece of metal in shape, of the upper cover 1. When the pressing component is pressed downwards, a movable terminal can be released to be in contact with the fixed terminal; when the pressing component restores, the movable terminal is driven upwards to be disconnected with the fixed terminal. Meanwhile, the pressing component 5 squeezes the piece of metal through the convex rib 52, so that the pressing touch sense is improved.

Figure 7:
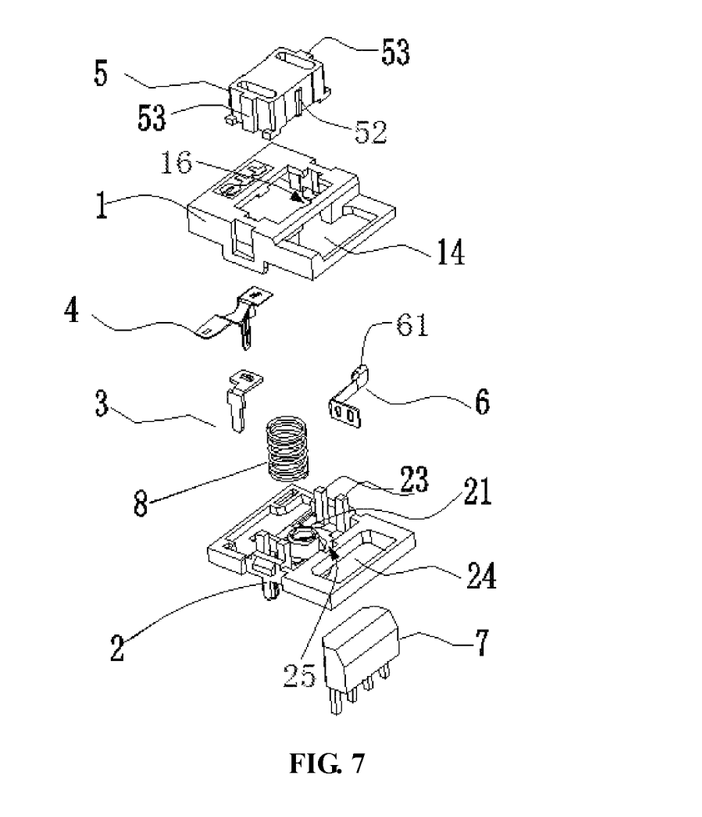
FIG. 7 is an explosive structure schematic diagram of a second embodiment of the switch of the invention.

In the embodiment, through holes 24 and 14 which are used for installing the indicator light are formed in the base and the upper cover correspondingly, and the indicator light 7 is installed in the through holes after the base and the upper cover are buckled.

Figure 8:
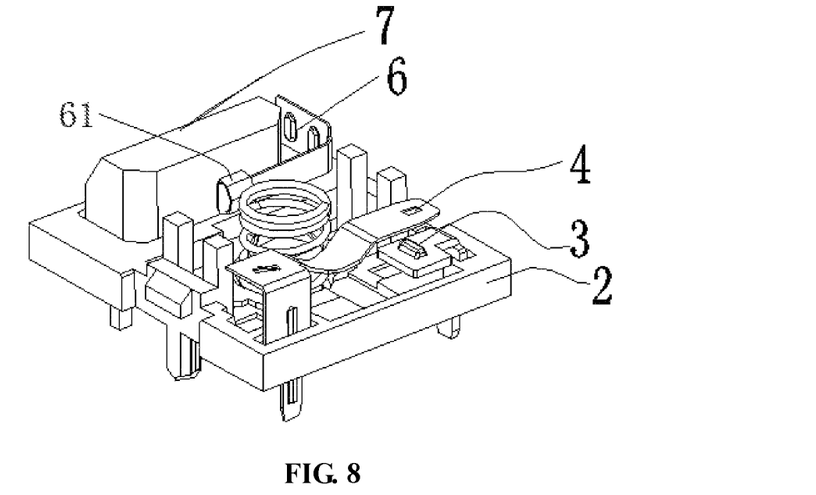
FIG. 8 is an internal structure assembly schematic diagram of a base of the second embodiment of the switch of the invention.
Figure 9:
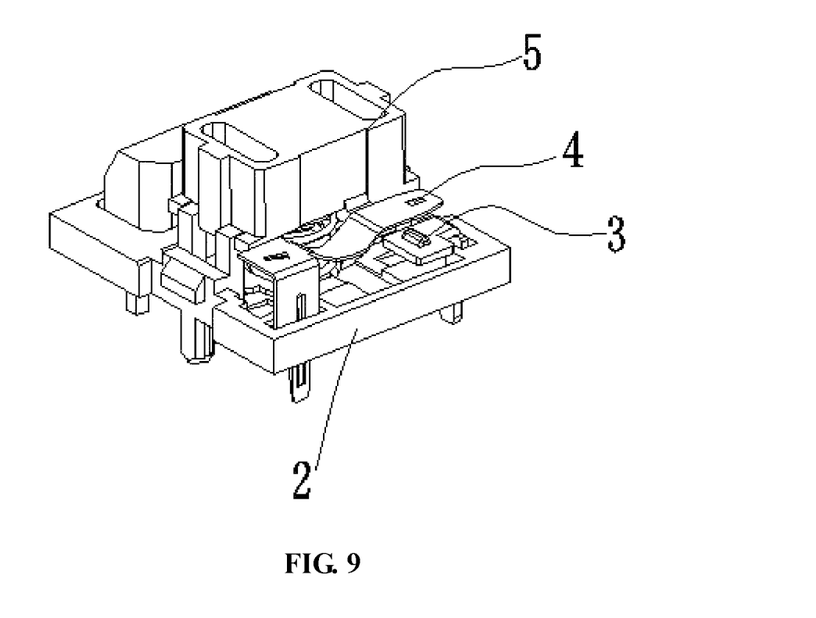
FIG. 9 is an assembly structure diagram of the base and a pressing component of the second embodiment of the switch of the invention.
Figure 10:
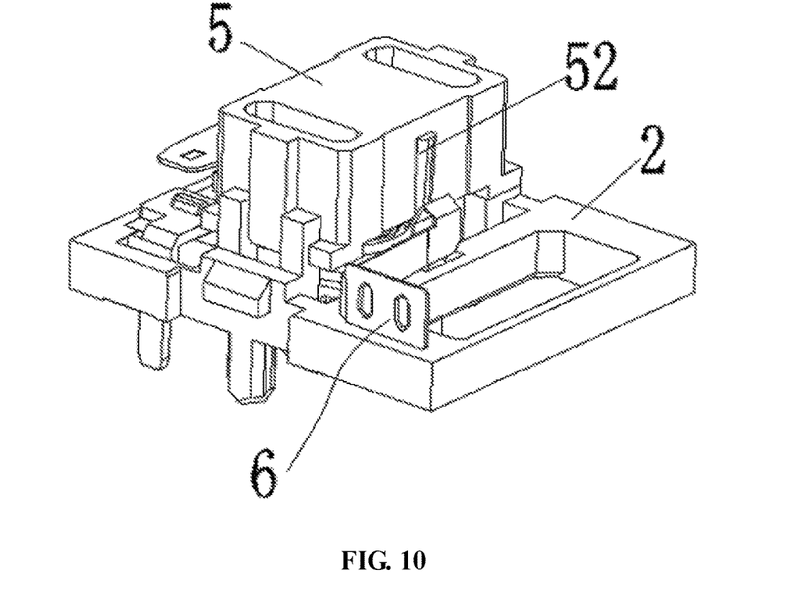
FIG. 10 is an assembly schematic diagram, at another angle, of the base and the pressing component of the second embodiment of the switch of the invention.
Figure 11:
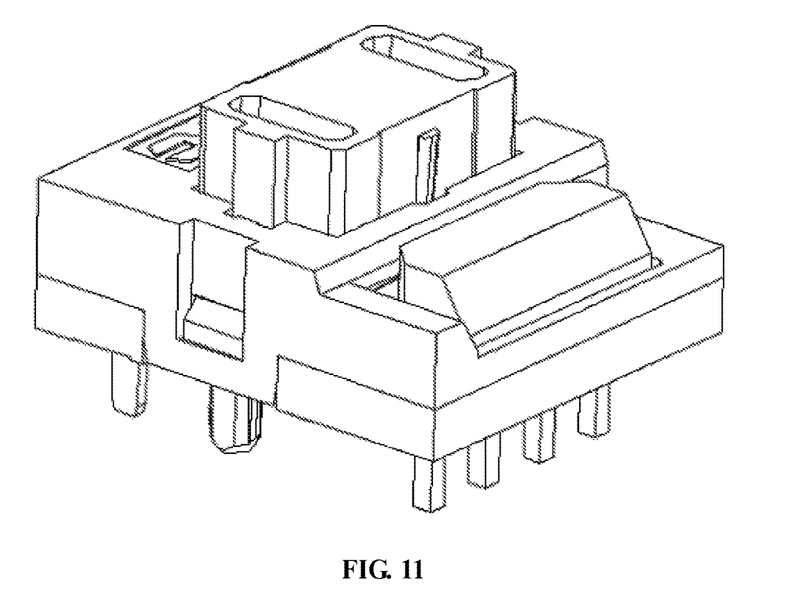
FIG. 11 is an integral assembly schematic diagram of the second embodiment of the switch of the invention.

In the embodiment, the structures of the fixed terminal 3 and the movable terminal 4 are the same as those in the first embodiment, and the fixed terminal 3 and the movable terminal 4 are fixed to one side of the base 2. As is shown in FIG. 5, FIG. 8 and FIG. 9, the movable terminal 4 is a movable touch piece of metal and is transversely arranged on the portion, in front of the guide column 21, of the base 2; the movable terminal 4 includes a fixing part 41 used for fixing, a contact part 43 vertically opposite to the fixed terminal 3 and an elastic bent part 42 connected between the fixing part 41 and the contact part 43, and the fixing part 41, the contact part 43 and the elastic bent part 42 are connected integrally; one end of the fixing part 41 stretches out of the base 2 to be connected with an external circuit, and the other end of the fixing part 41 is connected with the elastic bent part 42; a driving part is arranged at the end, close to the pressing component 5, of the contact part 43, and the driving part is square and is tightly attached to the upper portion of the protrusion 51 of the pressing component 5; when the pressing component 5 moves up and down, the protrusion 51 can control the contact part 43 to move up and down, and accordingly contact between the contact part 43 and the fixed terminal 3 is achieved. The fixing part 41 is fixed to the left side, in front of the guide column 21, of the base 2, and the contact part 43 is fixed to the right side, in front of the guide column 21, of the base 2; the fixed terminal 3 is arranged at the lower end of the contact part 43. The fixed terminal 3 is of a square structure, and a welded part 30 at one end of the fixed terminal 3 stretches out of the base 2 to be connected with an external circuit. A movable contact 431 and a static contact 31 are arranged on the contact portions of the movable terminal 4 and the fixed terminal 3 correspondingly, and the movable contact 431 and the static contact 31 are of columnar structures and perpendicular to each other so that the contact effect between the movable terminal 431 and the fixed terminal 31 can be guaranteed, and poor contact is avoided. The elastic bent part 42 is of a downward bent structure, so that breakover can be achieved easily through the up-down contact between the contact part 43 and the fixed terminal 3, fixed to the base 2, on the other side by bending a contact point. A through hole 411 is further formed in the fixing part 41, a positioning column is arranged on the upper cover, and the positioning column is riveted in the through hole 411 of the fixing part 41, so that that positioning and fixing of the fixing part 41 are achieved.

In the using process, when the pressing component 5 is pressed, the positioning rod of the pressing component 5 moves downwards along the guide hole of the guide column 21 of the base 2, the return spring 8 is squeezed, and the driving part of the movable terminal can be tightly attached to the protrusion 51 under the elasticity of the elastic bent part 42 and moves downwards along with the protrusion 51; when the movable terminal 4 moves downwards by a certain extent, the contact part 43 of the movable terminal 4 makes contact with the static contact 31 below the movable contact 431, the circuits connected to the movable terminal 4 and the fixed terminal 3 are closed, and a pressing signal is generated; when the pressing force is eliminated after the pressing component 5 is pressed, upward force is applied to the pressing component 5 through the restoration elastic force, and the protrusion 51 of the pressing component 5 can also be pushed upwards at the moment; since the driving part is arranged on the upper portion of the protrusion 51, the contact part 43 of the movable terminal 4 can be pushed upwards, the contact between the movable terminal 4 and the fixed terminal 3 can be cut off at the moment, and the movable terminal 4 and the fixed terminal 3 return to the positions before pressing.

A Third Embodiment

Figure 12:
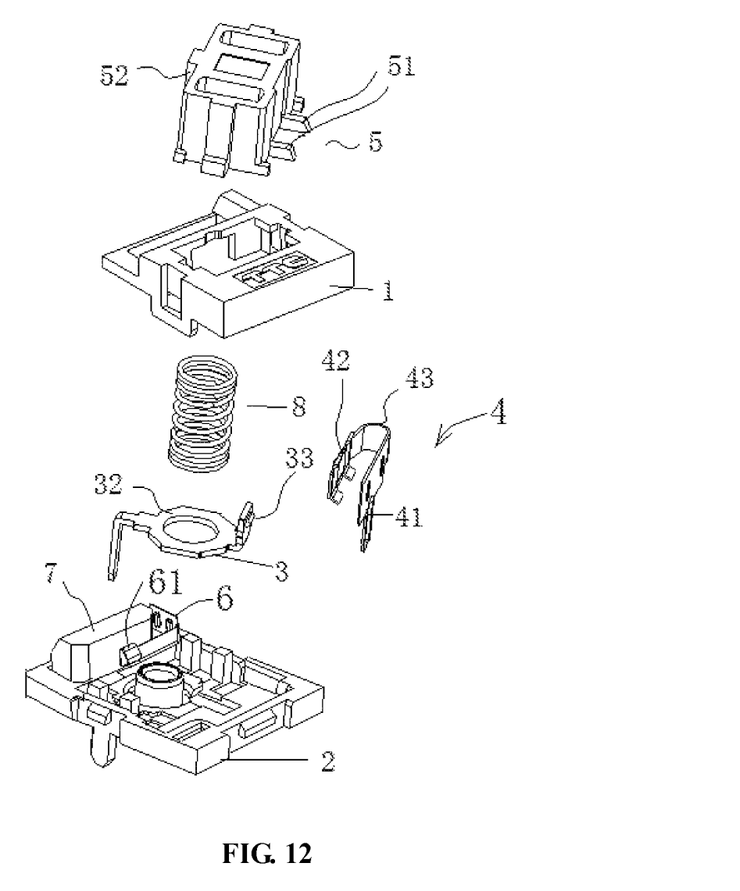
FIG. 12 is a structure schematic diagram of a third embodiment of the switch of the invention.

As is shown in FIG. 12, in the embodiment, the differences between the structure of the switch and the structure in the second embodiment are the structure and contact way of the movable terminal and the fixed terminal. As is shown in FIG. 12, the fixed terminal 3 includes an installation part 32 and a contact part 33, a through hole is formed in the installation part 32, and the fixed terminal 3 is connected to the guide column 21 in a sleeving mode through the through hole so as to be fixed; one end of the installation part is bent to be downwards and stretch out of the base 2 to form a pin, and the other end of the installation part is bent to extend upwards to form the contact part 33; the movable terminal 4 is a movable touch piece of metal and includes a fixing part 41 used for fixing, a contact part 42 corresponding to the fixed terminal 3 and an elastic bent part 43 connected between the fixing part and the contact part, and the fixing part 41, the contact part 43 and the elastic bent part 43 are connected integrally; the fixing part 41 vertically stretches out of the base 2 to form a pin, and the contact part is located on the side edge of the contact part of the fixed terminal through the elastic bent part.

In the using process, when the pressing component 5 is pressed, the positioning rod of the pressing component 5 moves downwards along the guide hole of the guide column of the base 2, the return spring is squeezed, and the slope of the protrusion 51 of the pressing component 5 can move downwards along the contact part 42 of the movable terminal 4; the supporting force of the protrusion 51 of the pressing component 5 to the contact part 42 disappears, so that the contact part 43 moves forwards through the elastic force generated after a metal sheet is bent and finally makes contact with the fixed terminal 3, the circuits connected to the movable terminal 4 and the fixed terminal 3 correspondingly are closed, and a signal is generated; the pressing component 5 squeezes the touch-sensitive piece of metal 6 through the convex rib 52 at the same time, so that an operator can have an obvious pressing touch sense. When the pressing force is eliminated after the pressing component 5 is pressed, upward force is applied to the pressing component 5 through the restoration elastic force, and the protrusion 51 of the pressing component 5 can also be pushed upwards at the moment; under the effect of the slope, the contact part 43 of the movable terminal 4 can be pushed backwards, the contact between the movable terminal 4 and the fixed terminal 3 can be cut off at the moment, and the movable terminal 4 and the fixed terminal 3 return to the positions before pressing. In the embodiment, the switch is also provided with the indicator light 7.

Figure 16:
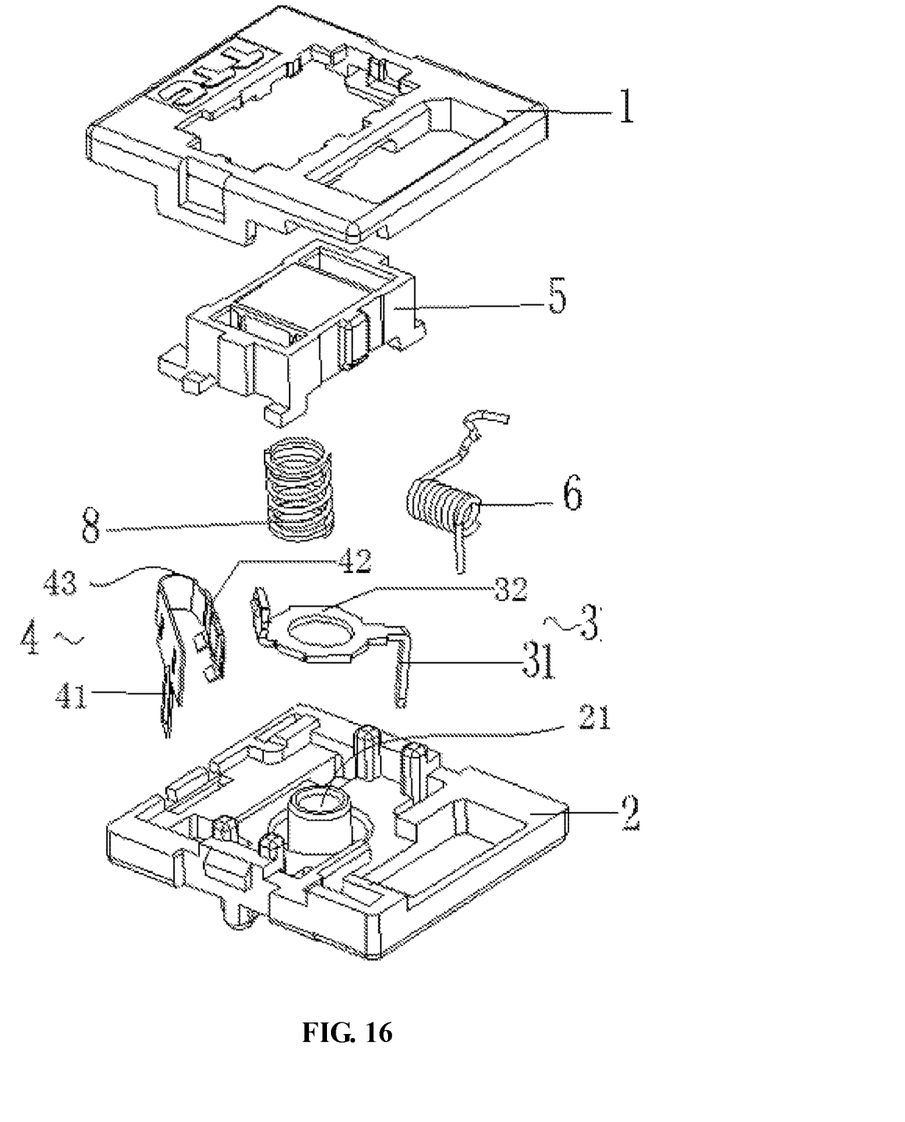
FIG. 16 is a structure schematic diagram of a sixth embodiment of the switch of the invention.

In the embodiment, repeated description of parts the same as those in the first embodiment and the second embodiment is omitted; in addition, in the embodiment, an elastic auxiliary component for enhancing the touch sense is a touch-sensitive piece of metal, a torsional spring can also be adopted during actual application, the installation way of the torsional spring is the same as that in the first embodiment, the convex rib on the side face of the pressing component is arranged in the way in the first embodiment, and please see a sixth embodiment shown in FIG. 16.

Figure 13:
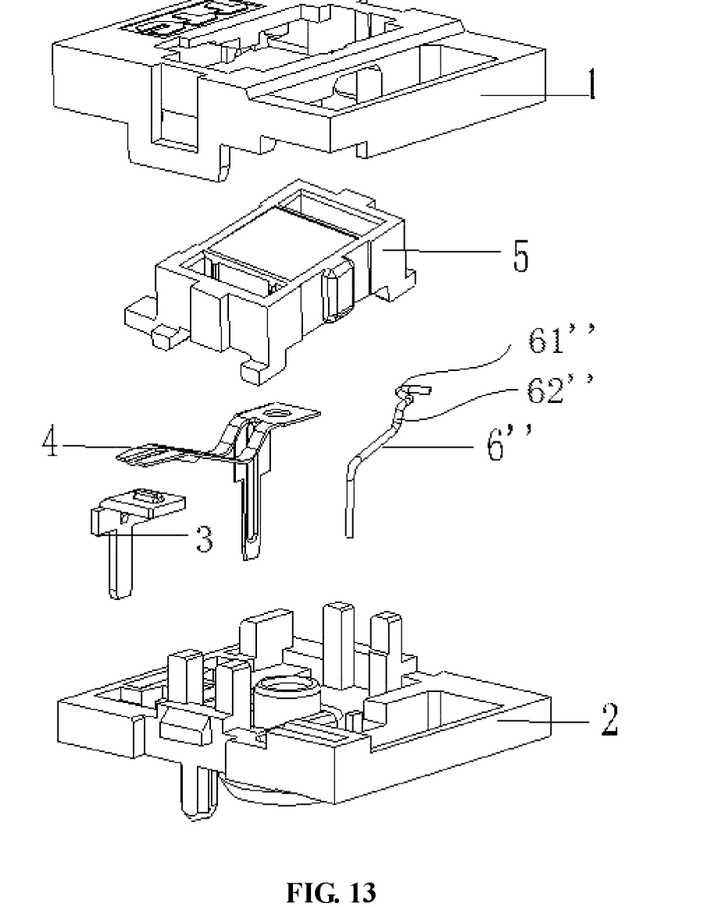
FIG. 13 is an explosive structure schematic diagram of a fourth embodiment of the switch of the invention.
Figure 14:
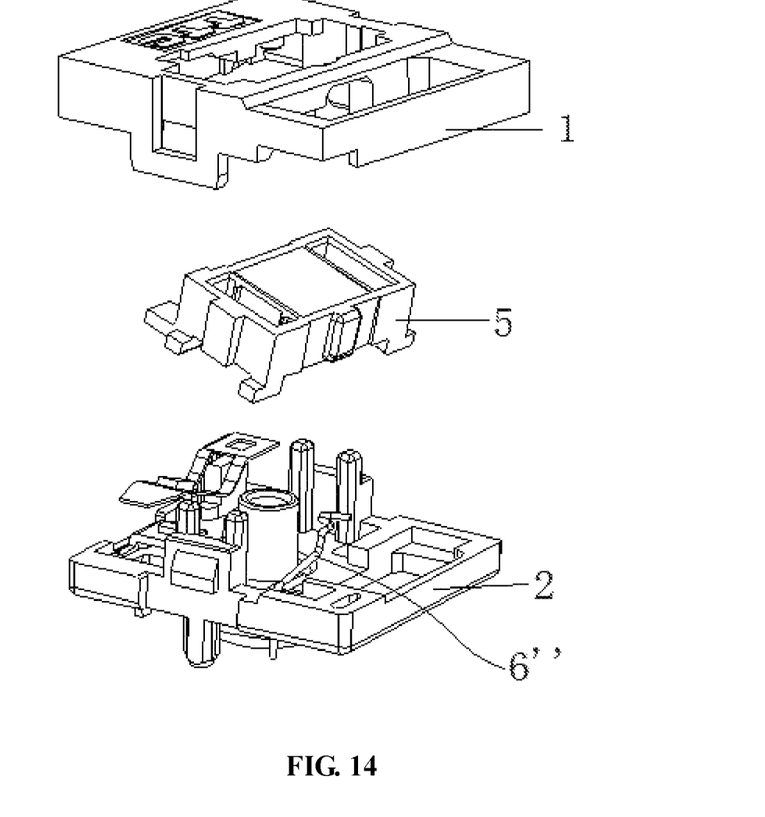
FIG. 14 is a partial assembly structure schematic diagram of the fourth embodiment of the switch of the invention.

Actually, various changes of the structure and specific installation way of the elastic auxiliary components can be made according to the embodiments of the invention, for example, the structure of the fourth embodiment shown in FIG. 13 and FIG. 14 can also be adopted. In the embodiment, the elastic auxiliary component is an elastic component which is similar to the structure of the stretching-out end of the torsional spring in the first embodiment of the invention, one end of the elastic component can be vertically fixed to the base, and the other end of the elastic component is located on the side face of the pressing component. An upward protrusion 62" and a transverse bent part 61" are arranged at the end, located on the side face of the pressing component, of the elastic component, and through the protrusion 62", only the front-end bent part of the stretching-out end of the elastic component makes contact with the upper cover, the portion close to the fixing end of the elastic component cannot make contact with the upper cover, and thus intervention is avoided. The stretching-out end of the elastic component abuts against the lower portion of the upper cover through upward elastic force in a non-pressing state, and the bent part 61" transversely protrudes to be limited on the guide slope; when the pressing component is pressed downwards, the bent part 61" is pressed by the guide slope to move downwards to a certain position, the bent part 61" disengages from the guide slope, rebounds to restore and knocks the lower portion of the upper cover, sounds are made, and thus the auditory effect of the key is improved. The principle of the fourth embodiment is the same as that of the first embodiment, other structures of the switch are the same or similar to those in the first embodiment, and thus repeated description is omitted.

Figure 15:
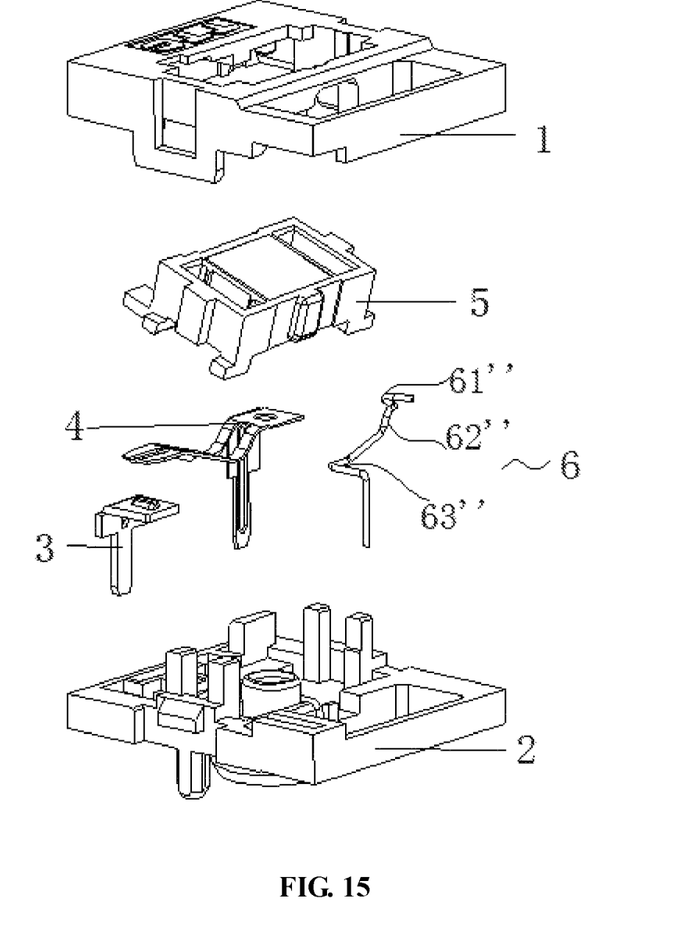
FIG. 15 is a structure schematic diagram of a fifth embodiment of the switch of the invention.

In the embodiment shown in FIG. 15, the front section of the elastic component is transversely bent on the basis of the fourth embodiment to form a bent part 63", so that the effect of avoiding the structure on the base 1 is achieved, and meanwhile the elasticity of the elastic component can be improved by additionally arranging the transverse bent part 63".

Instruction is given with the keyboard switch as the example in the invention, and actually, the switch structure in the invention is not limited to the keyboard switch and can be popularized in any switch field; in addition, the structures of the movable terminal and the fixed terminal are not limited to the embodiments given in the invention, and those skilled in the field can change the structure according to requirements.

The above embodiments are only preferred embodiments of the invention and are specifically described in detail, however, the patent scope of the invention is not limited to the embodiments. What needs to be pointed out is that for those skilled in the field, various transformations and improvements can be made without deviating from the concept of the invention, and the obvious alternative forms are all within the protection scope of the invention.

What is claimed is:

1. A keyboard switch, comprising:
   an upper cover (1), a base (2), a fixed terminal (3), a movable terminal (4) and a pressing component (5);
   wherein a guide column (21) is arranged in the middle of the base (2), the pressing component (5) is installed on the guide column (21) on which a return spring is sleeved, and the upper end of the pressing component (5) is exposed out of the upper cover (1) for pressing; the upper cover (1) and the base (2) are buckled, so that a cavity is formed between the upper cover (1) and the base (2); the fixed terminal (3) and the movable terminal (4) are arranged, in the cavity, alongside the pressing component, and one end of the fixed terminal (3) and one end of the movable terminal (4) both stretch out of the base (2) to be connected with an external circuit; the pressing component (5) moves up and down to drive the movable terminal (4) to move, and further to control contact and disconnection between the other end of the movable terminal (4) and the other end of the fixed terminal (3);
   wherein an elastic auxiliary component which interferes with the pressing component to enhance a pressing sense is further arranged alongside the pressing component, the pressing component (5) moves up and down to drive the movable terminal to act and meanwhile the pressing component interferes with the elastic auxiliary component so that the pressing sense of the keyboard switch is enhanced;
   wherein the elastic auxiliary component is a torsional spring (6'), the torsional spring is transversely arranged on the base, one end of the torsional spring is fixed to the base, the other end of the torsional spring stretches out towards a side edge of the pressing component (5), a convex rib (52') is arranged on the corresponding side face of the pressing component, and the pressing component (5) links the movable terminal to act and presses the torsional spring downwards through the convex rib at the same time to enhance the pressing sense.

2. The keyboard switch according to claim 1, wherein guide grooves are formed in positions, corresponding to the convex rib, of the upper cover (1) and the base (2) correspondingly.

3. The keyboard switch according to claim 1, wherein a bent part (61') is arranged at the stretching-out end of the torsional spring, a lower end of the convex rib (52') on the corresponding side face of the pressing component is a guide slope, the stretching-out end of the torsional spring abuts against a lower portion of the upper cover by means of upward elastic force in a non-pressing state, the bent part (61') transversely protrudes to be limited on the guide slope, the bent part (61') is pressed by the guide slope to move downwards to a certain position by pressing the pressing component downwards, and the bent part (61') disengages from the guide slope, rebounds to be restored and knocks the lower portion of the upper cover to make a sound, so that an auditory effect of the switch is improved.

4. The keyboard switch according to claim 3, wherein at least one protrusion extends out towards the movable terminal from one side of the pressing component, and when the pressing component moves up and down, the movable terminal is driven by the protrusion to move so as to be disconnected with the fixed terminal or be in contact with the fixed terminal.

5. The keyboard switch according to claim 3, wherein limiting columns or limiting grooves are arranged on the portions, correspond to the two side edges of the pressing component, of the base, and limiting grooves or limiting columns are arranged on the two side edges of the pressing component correspondingly.

6. The keyboard switch according to claim 3, wherein the keyboard switch further comprises a key indicator light, and through holes used for installing the indicator light are formed in the base and the upper cover correspondingly.

7. The keyboard switch according to claim 1, wherein a bent part (61') is arranged at the stretching-out end of the torsional spring, a lower end of the convex rib (52') on the corresponding side face of the pressing component is a guide slope, the bent part (61') transversely protrudes to be limited on the guide slope; when the pressing component is pressed downwards, the bent part (61') is pressed by the guide slope to move downwards to a certain position then disengages from the guide slope.

8. The keyboard switch according to claim 7, wherein the stretching-out end of the torsional spring abuts against a lower portion of the upper cover by means of upward elastic force in a non-pressing state, and after disengaging from the guide slope the stretching-out end of the torsional spring rebounds to be restored and knocks the lower portion of the upper cover to make a sound, so that an auditory effect of the switch is improved.

9. The keyboard switch according to claim 7, wherein an upward protrusion (62') is defined at the stretching-out end of the torsional spring, and is between a torsional spring body and the bent part (61') of the stretching-out end of the torsional spring.

10. The keyboard switch according to claim 9, wherein through the protrusion (62'), only the bent part of the stretching-out end of the torsional spring makes contact with the upper cover 1, a portion close to the torsional spring body does not make contact with the upper cover.

* * * * *